(12) United States Patent
Joe et al.

(10) Patent No.: US 9,166,705 B2
(45) Date of Patent: Oct. 20, 2015

(54) SEMICONDUCTOR APPARATUSES HAVING OPTICAL CONNECTIONS BETWEEN MEMORY CONTROLLER AND MEMORY MODULE

(75) Inventors: In-sung Joe, Seoul (KR); Kyoung-ho Ha, Seoul (KR); Ju-hwan Yi, Seoul (KR); Yoon-dong Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1097 days.

(21) Appl. No.: 12/457,269

(22) Filed: Jun. 5, 2009

(65) Prior Publication Data
US 2009/0304389 A1    Dec. 10, 2009

Related U.S. Application Data

(60) Provisional application No. 61/129,114, filed on Jun. 5, 2008.

(30) Foreign Application Priority Data

Apr. 3, 2009    (KR) .................. 10-2009-0029057

(51) Int. Cl.
| | |
|---|---|
| H04B 10/00 | (2013.01) |
| H04B 10/80 | (2013.01) |
| G02B 6/42 | (2006.01) |
| H04B 10/12 | (2006.01) |
| G02B 6/38 | (2006.01) |
| G02B 6/43 | (2006.01) |

(52) U.S. Cl.
CPC ............... *H04B 10/801* (2013.01); *G02B 6/42* (2013.01); *G02B 6/4214* (2013.01); *G02B 6/3885* (2013.01); *G02B 6/43* (2013.01)

(58) Field of Classification Search
CPC ..... H04B 10/278; H04B 10/80; H04B 10/801
USPC ............ 398/140, 163, 58, 63, 66, 67, 70, 72, 398/153, 60
See application file for complete search history.

(56) References Cited

U.S. PATENT DOCUMENTS

| | | | |
|---|---|---|---|
| 2003/0026141 A1* | 2/2003 | Cordes et al. ................. | 365/200 |
| 2004/0024959 A1* | 2/2004 | Taylor ........................... | 711/105 |
| 2004/0126115 A1* | 7/2004 | Levy et al. .................... | 398/116 |
| 2009/0097851 A1* | 4/2009 | Tan et al. ....................... | 398/82 |

OTHER PUBLICATIONS

Japanese Office Action dated Aug. 20, 2013 for corresponding Japanese Application No. 2009-136583.

* cited by examiner

*Primary Examiner* — Daniel Dobson
(74) *Attorney, Agent, or Firm* — Harness, Dickey & Pierce, P.L.C.

(57) ABSTRACT

Semiconductor apparatuses having optical connections between a memory controller and a memory module are provided. A semiconductor apparatus includes a memory controller, at least one socket configured to receive a memory module, and a first optical-electrical module. A second optical-electrical module is mounted in the socket and optically coupled to the first optical-electrical module via at least one optical channel.

20 Claims, 14 Drawing Sheets

SEMICONDUCTOR APPARATUSES HAVING OPTICAL CONNECTIONS BETWEEN MEMORY CONTROLLER AND MEMORY MODULE

CROSS-REFERENCE TO RELATED APPLICATION(S)

This application claims priority under 35 U.S.C. §119 to provisional application No. 61/129,114, filed on Jun. 5, 2008, in the U.S. Patent and Trademark Office, and Korean Patent Application No. 10-2009-0029057, filed on Apr. 3, 2009, in the Korean Intellectual Property Office. The entire contents of each of these applications are incorporated herein by reference.

BACKGROUND

1. Field

The general inventive concept relates to semiconductor apparatuses having optical connections between at least two components.

2. Description of the Conventional Art

As data transmission speeds between a central processing unit (CPU) and a main memory module increase, the number of memory modules (e.g., dual inline memory modules (DIMMs)) connected to a single CPU decreases. The number of memory modules is limited because signal integrity may be reduced by impedance mismatch generated when electrical signals are transmitted using various modules. In one example, with respect to a double date rate three (DDR3) memory module, two DIMMs may be connected to a single CPU using conventional electrical connections.

SUMMARY

The general inventive concept relates to semiconductor apparatuses having optical connections through which high-speed data transmissions are performed, and by which memory modules are more stably connected with little or no influence on transmitted data.

At least one example embodiment provides a semiconductor apparatus. According to at least this example embodiment, the semiconductor apparatus includes a memory controller, a memory module connected to the memory controller, and a socket in which the memory module is mounted. The semiconductor apparatus further includes a first optical-electrical module connected to the memory controller, an optical channel having a first end connected to the first optical-electrical module and a second end extending toward the socket, and a system board on which at least some of the components that compose the semiconductor apparatus are mounted. Further still, the semiconductor apparatus includes a second optical-electrical module disposed between the optical channel and the memory module. The second optical-electrical module is mounted in the socket.

According to at least some example embodiments, the second optical-electrical module may be disposed on the bottom surface of the socket to face the optical channel. A plurality of optical power distributors may be arranged between the memory controller and the socket.

At least one other example embodiment provides a semiconductor apparatus. According to at least this example embodiment, the semiconductor apparatus includes a memory controller, a memory module connected to the memory controller, and a socket in which the memory module is mounted. The semiconductor apparatus further includes a first optical-electrical module connected to the memory controller, an optical channel having a first end connected to the first optical-electrical module and a second end extending toward the socket, and a system board on which at least some of the components that compose the semiconductor apparatus are mounted. The optical channel may be extended via the socket to a next socket. Still further, the semiconductor apparatus includes an optical coupler splitting and coupling optical signals between the optical channel and the memory module, and a first optical connector configured to transmit optical signals between the optical coupler and the memory module. The optical connector is disposed or arranged in the socket.

According to at least some example embodiments, the semiconductor apparatus may further include an optical connector arranged between the first optical-electrical module and the socket. The semiconductor apparatus may further include a second optical connector configured to transmit an optical signal between the first optical connector and the memory module. The second optical connector may be disposed in the memory module to be connected to the first optical connector. A second optical-electrical module may be disposed between the second optical connector and a plurality of memory chips mounted on the memory module. The second optical-electrical module may be configured to convert a signal from one of the second optical connector and the memory chip, and transmit the converted signal to the other of the second optical connector and the memory chip.

According to at least some example embodiments, the memory module and the socket may further include a memory module fixing (or supporting) unit configured to fix the memory module within the socket. A plurality of optical power distributors may be disposed between the first optical-electrical module and the socket. At least two memory module groups may be connected to the optical power distributors, and each of the memory module groups may include a plurality of memory modules.

At least one other example embodiment provides a semiconductor apparatus. According to at least this example embodiment, the semiconductor apparatus includes a memory controller, a memory module connected to the memory controller, and a socket in which the memory module is mounted. The semiconductor apparatus further includes a first optical-electrical module connected to the memory controller, an optical channel having a first end connected to the first optical-electrical module and a second end extending toward the socket, and a system board on which at least some of the components of the semiconductor apparatus are mounted. The optical channel may be extended via the socket to a next socket. Still further, the semiconductor apparatus includes an optical coupler splitting and coupling optical signals between the optical channel and the memory module, and a second optical-electrical module optically connected to the optical coupler and disposed between the memory chip of the memory module and the optical coupler. The second optical-electrical module is disposed in a lower portion of the memory module, which is inserted into the socket.

According to at least some example embodiments, the socket may include a hole through which the second optical-electrical module passes. A second optical-electrical module side portion of the socket may be open. A plurality of optical power distributors may be disposed between the first optical-electrical module and the socket. At least two memory module groups may be connected to the optical power distributors. Each of the memory module groups may include a plurality of memory modules. At least one memory module may include the second optical-electrical module and a buffer chip.

At least one other example embodiment provides a semiconductor apparatus. According to at least this example embodiment, the semiconductor apparatus includes a memory controller, a memory module connected to the memory controller, and a socket in which the memory module is mounted. The semiconductor apparatus further includes a first optical-electrical module connected to the memory controller, an optical channel having a first end connected to the first optical-electrical module and a second end extending toward the socket, and a system board on which at least some of the components of the semiconductor apparatus are mounted. The optical channel may be extended via the socket to a next socket. Still further, the semiconductor apparatus includes an optical power splitter splitting a portion of an optical signal on the optical channel and directing the portion of the optical signal to the memory module, an optical system transmitting the portion of the optical signal split by the optical power splitter to a memory chip of the memory module, and a second optical-electrical module configured to convert a signal from one of the optical system and the memory chip, and transmit the converted signal to the other of the optical system and the memory chip.

According to at least some example embodiments, the optical power splitter may be an optical reflector configured to partially reflect incident light, but transmit residual incident light.

The optical system may include a first optical system including first micro ball lens on which light from the optical power splitter is incident, a second optical system including a second micro ball lens on which light from the first optical system is incident and a reflective surface, and a third optical system including a third micro ball lens on which light reflected by the reflective surface is incident. The first optical system may be disposed inside of the socket so that the optical axis of the first optical system is aligned with the optical axis of the optical power splitter. The second optical system may be disposed inside of the memory module, and the memory module may be disposed on the first optical system in the socket so that the optical axis of the second optical system is aligned with the optical axis of the first optical system. The third optical system may be formed as a package with the memory chip so that the optical axis of the third optical system is aligned with the optical axis of the second optical system. The second optical-electrical module may be disposed within the memory chip.

According to at least some example embodiments, an optical-electrical module may include a modulator using silicon photonic techniques, a photodiode, and an external light source. A plurality of optical power distributors may be disposed or arranged between the first optical-electrical module and the optical power splitter.

In semiconductor apparatuses according to at least some example embodiments, the memory controller and the first optical-electrical module may form a CPU package, and the memory controller and the first optical-electrical module may be disposed on the same board or different boards. In this regard, an optical connector optically connected to the first optical-electrical module may be disposed between the CPU package and the socket. In addition, electrical wires may be disposed between the memory controller and the socket.

At least one other example embodiment provides a semiconductor apparatus. According to at least this example embodiment, the semiconductor apparatus includes a memory controller, at least one socket configured to receive a memory module, first and second optical-electrical modules. The first optical-electrical module is connected to the memory controller. The second optical-electrical module is mounted in the socket and optically coupled to the first optical-electrical module via at least one optical channel.

According to at least some example embodiments, the semiconductor apparatus may further include a memory module mounted in the socket. The memory module may be connected to the second optical-electrical module. The second optical-electrical module may be configured to convert electrical signals from the memory module into optical signals and output the optical signals to the first optical-electrical module via the optical channel, and convert optical signals from the optical channel into electrical signals to be input to the memory module.

According to at least some example embodiments, the semiconductor apparatus may include a plurality of sockets and a plurality of optical channels. Each of the plurality of sockets may include a second optical-electrical module mounted therein, and each of the second optical-electrical modules may be optically coupled to the first optical-electrical module via at least one of the plurality of optical channels.

At least one other example embodiment provides a semiconductor apparatus. According to at least this example embodiment, the semiconductor apparatus includes a memory controller, a socket configured to receive a memory module, a first optical connector disposed in the socket; and an optical coupler optically coupled to the memory controller and the first optical connector via corresponding optical channels. The optical coupler is configured to split and couple optical signals between the memory controller and the first optical connector.

According to at least some example embodiments, the semiconductor apparatus may further include: a second optical connector connected between the memory controller and the optical coupler; a memory module mounted in the socket; and/or a third optical connector disposed on the memory module. The third optical connector may be in optical communication with the first optical connector.

The memory module may include a plurality of memory chips. An optical-electrical module may be mounted on the memory module and may be configured to convert electrical signals from the plurality of memory chips into optical signals to be output to the third optical connector, and convert optical signals from the third optical connector into electrical signals to be input to the plurality of memory chips. The memory controller may also include an optical-electrical module and a central processing unit (CPU) coupled together via electrical wires.

At least one other example embodiment provides a semiconductor apparatus. According to at least this example embodiment, the semiconductor apparatus includes a memory controller, a first optical-electrical module connected to the memory controller, a socket, a memory module removably mounted in the socket, a second optical-electrical module mounted on one of the socket and the memory module. The second optical-electrical module is electrically coupled to the memory module, and optically coupled to the first optical-electrical module via an optical channel. The second optical-electrical module may be configured to convert input optical signals from the first optical-electrical module into output electrical signals to be transmitted to the memory module, the input optical signals and the output electrical signals carrying information generated by the memory controller, and convert input electrical signals from the memory module into output optical signals to be transmitted to the first optical-electrical module, the input electrical signals and the output optical signals including information generated by the memory module.

According to at least one example embodiment, high-speed data transmission may be performed without damage or loss of data, and the number of memory modules connected to the CPU may increase.

BRIEF DESCRIPTION OF THE DRAWINGS

Example embodiments will be more clearly understood from the following detailed description taken in conjunction with the accompanying drawings in which.

DETAILED DESCRIPTION

Figure 1:
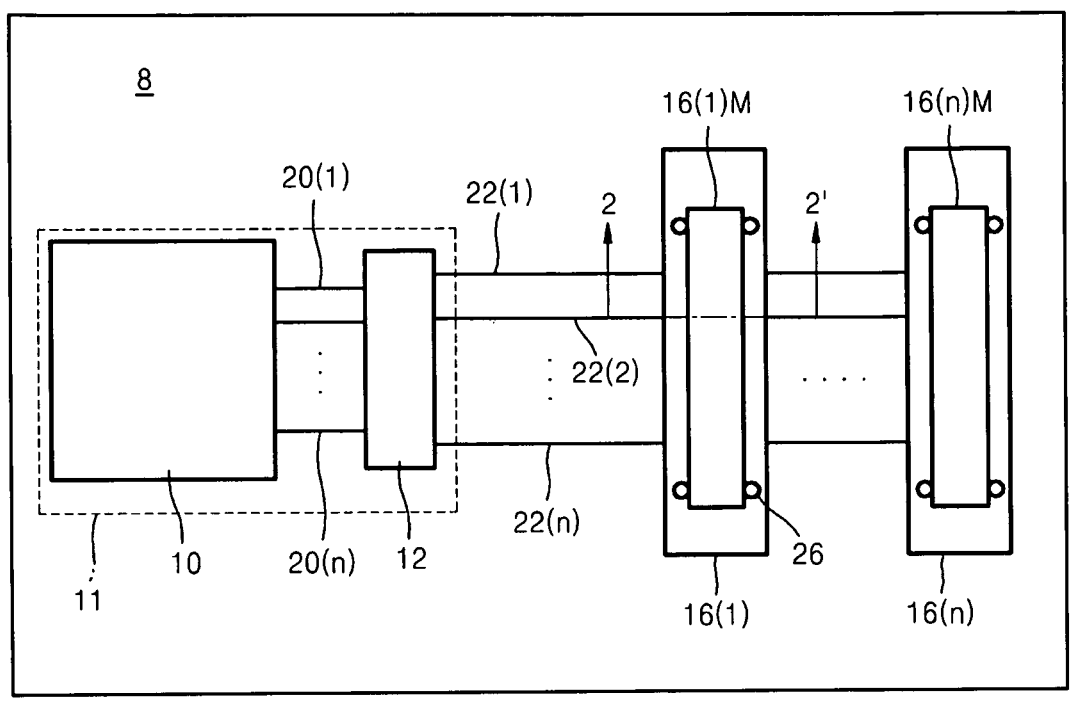
FIG. 1 is a plan view of a semiconductor apparatus having optical connections according to an example embodiment.

The general inventive concept will now be described more fully with reference to the accompanying drawings, in which example embodiments are shown. In the drawings, the thicknesses of layers and regions are exaggerated for clarity. Like reference numerals in the drawings denote like elements. In the drawings, the thicknesses of layers and regions are exaggerated for clarity.

Detailed illustrative embodiments are disclosed herein. However, specific structural and functional details disclosed herein are merely representative for purposes of describing example embodiments. The general inventive concept may, however, may be embodied in many alternate forms and should not be construed as limited to only the example embodiments set forth herein.

It should be understood, however, that there is no intent to limit the general inventive concept to the particular example embodiments disclosed, but on the contrary example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Semiconductor memory apparatuses having optical connections between a memory controller and a memory modules are provided FIG. 1 is a plan view of a semiconductor apparatus having optical connections according to an example embodiment.

Referring to FIG. 1, according to this example embodiment a semiconductor apparatus includes a memory controller 10, a first optical-electrical module 12, and a plurality of sockets 16(1)-16(n) (where n is a natural number greater than 1). Each of the memory controller 10, the first optical-electrical module 12, and the plurality of sockets 16(1)-16(n) are mounted on a system board 8. The memory controller 10 may include a central processing unit (CPU) (not shown). Alternatively, the CPU may be separate from and connected to the memory controller 10. The first optical-electrical module 12 may include a light emitting device, a light receiving device, and an optical-electrical conversion circuit for converting optical signals into electrical signals and vice-versa.

The memory controller 10 is connected to the first optical-electrical module 12 via a plurality of wires 20(1)-20(n) (where n is a natural number larger than 1) through which electrical signals may be transmitted. The first optical-electrical module 12 and the memory controller 10 may constitute a CPU package 11.

Still referring to FIG. 1, the first optical-electrical module 12 is connected to the plurality of the sockets 16(1)-16(n) via a plurality of transmission lines 22(1)-22(n). The plurality of transmission lines 22(1)-22(n) may be optical links, for example, optical fibers, optical waveguides, etc.

Memory modules 16(1)M-16(n)M may be mounted (e.g., removably mounted or fixed) in the sockets 16(1)-16(n), respectively. Information may be transmitted between the memory controller 10 and the memory modules 16(1)M-16(n)M at least partially using optical signals rather than electrical signals. Accordingly, relatively large quantities of information may be transmitted at relatively high speeds. At least a portion of the transmission lines 22(1)-22(n) may be electrical wires supplying power to the memory modules 16(1)M-16(n)M and/or a second optical-electrical module that may also be mounted on the sockets 16(1)-16(n). The second optical-electrical module will be described in more detail later.

Each of the sockets 16(1)-16(n) may include 4 guide pins 26 to align the memory modules 16(1)M-16(n)M within the sockets 16(1)-16(n). The guide pins 26 electrically, mechanically, and optically align the memory modules 16(1)M-16(n)M and sockets 16(1)-16(n). The sockets 16(1)-16(n) may have shapes different from that shown in FIG. 1. The location of the guide pins 26 may also be different from that of FIG. 1. The memory modules 16(1)M-16(n)M may be dual inline memory modules (DIMMs) or single inline memory modules (SIMMs).

Figure 2:
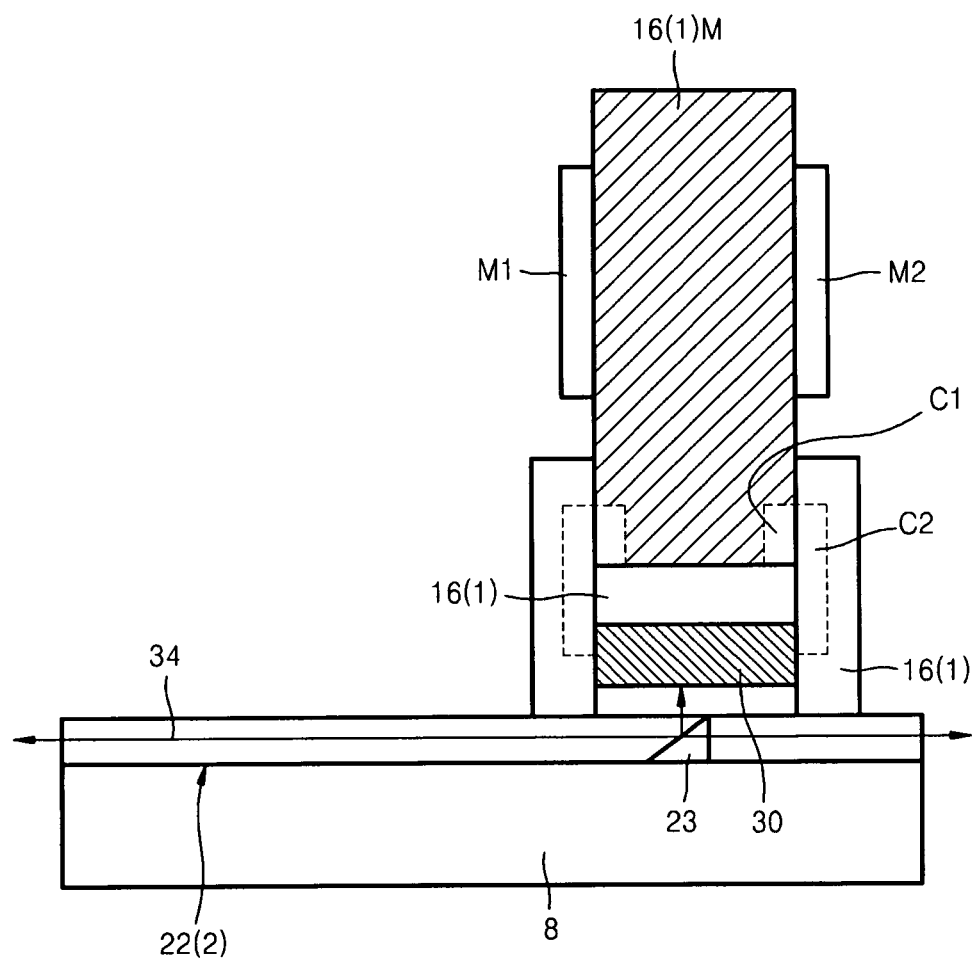
FIG. 2 is a cross-sectional view of a portion of the semiconductor apparatus of FIG. 1 taken along a line 2-2'.

FIG. 2 is a cross-sectional view of a portion of the semiconductor apparatus of FIG. 1 taken along a line 2-2'.

Referring to FIG. 2, in at least this example embodiment a second optical-electrical module 30 is integrally mounted in the socket 16(1). The second optical-electrical module 30 is disposed on a bottom surface of the socket 16(1), but spaced apart from the system board 8. The socket 16(1) extends along both sides of the second optical-electrical module 30 and is mounted on the system board 8. An optical coupler (not shown) may be disposed between the second optical-electrical module 30 and the system board 8. The optical coupler deflects a portion of an optical signal from the optical transmission line 22(2) toward the second optical-electrical module 30, and transfers an optical signal from the second optical-electrical module 30 to the optical transmission line 22(2).

The memory module 16(1)M includes a first contact element C1 formed in portions at each side of the memory module 16(1)M. A second contact element C2 is formed in portions of the socket 16(1) that are adjacent to the memory module 16(1)M when the memory module 16(1)M is inserted into the socket 16(1). Each second contact element C2 is connected to the second optical-electrical module 30. When the memory module 16(1)M is inserted into the socket 16(1), each first contact element C1 contacts a corresponding second contact element C2.

Still referring to FIG. 2, the memory module 16(1)M includes a first memory chip M1 and a second memory chip M2 mounted on opposite surfaces. Although FIG. 1 shows only one memory chip on each surface, a plurality of memory chips similar to or the same as the first and second memory chips M1 and M2 may be mounted on the surfaces of the memory module 16(1).

An optical power splitter 23 is disposed on the optical transmission line 22(2). The optical power splitter 23 may split a portion of an optical signal 34 transmitted from the memory controller 10 via the optical transmission line 22(2). The residual optical signal 34 is transmitted through the optical power splitter 23. In one example, the optical power splitter 23 may be a prism. The light path of the light split by the optical power splitter 23 may be directed (e.g., reflected or refracted) upward to be incident on the second optical-electrical module 30. The second optical-electrical module 30 converts the input optical signal into an electrical signal to be transmitted to the first memory chip M1 and/or the second memory chip M2 of the memory module 16(1)M.

According to at least this example embodiment, the optical signal 34 may be high speed data, such as a data write signal or a clock signal. The optical signal 34 may also be low speed data, such as an order or an address.

Meanwhile, the second optical-electrical module 30 also converts electrical signals generated by the memory modules 16(1)M into an optical signal 34. The converted optical signal 34 is transmitted to the first optical-electrical module 12 (in FIG. 1) via the optical transmission line 22(2). The first optical-electrical module 12 converts the optical signal 34 into electrical signals and transmits the electrical signals to the memory controller 10. In this regard, the optical signal 34 may be, for example, a read signal or information including the state of the first memory chip M1 or the state of the second memory chip M2.

Figure 3:
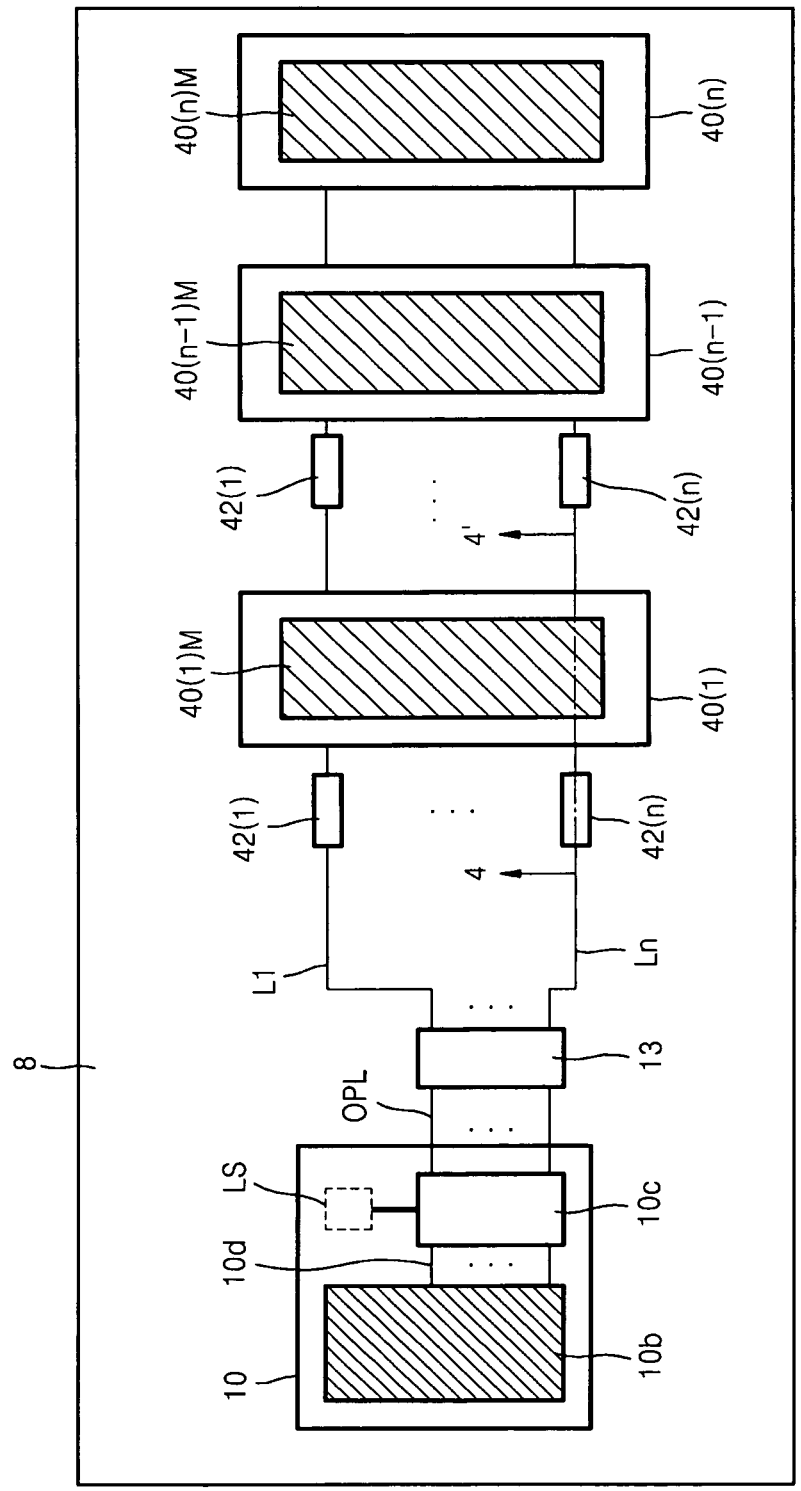
FIG. 3 is a plan view of a semiconductor apparatus having optical connections according to another example embodiment.

FIG. 3 is a plan view of a semiconductor apparatus having optical connections according to another example embodiment.

Referring to FIG. 3, according to this example embodiment the memory controller 10 mounted on the system board 8 (or a main board) includes a CPU 10b and a first optical-electrical module 10c. The first optical-electrical module 10c may include a light source LS (e.g., a laser diode or the like). The light source LS may be arranged outside of the first optical-electrical module 10c, but within the memory controller 10. The CPU 10b is connected to the first optical-electrical module 10c via a plurality of electrical wires 10d. A first optical connector 13 and a plurality of sockets 40(1)-40(n) are also mounted on the system board 8. The first optical connector 13 is connected to the first optical-electrical module 10c via a plurality of optical channels OPL.

Memory modules 40(1)M-40(n)M may be mounted (e.g., removably mounted or fixed) in the sockets 40(1)-40(n), respectively. The first optical connector 13 is connected to the socket 40(1), hereinafter referred to as the first socket 40(1), via a plurality of optical channels L1-Ln. Optical couplers 42(1)-42(n) are disposed in front of each of the sockets 40(1)-40(n), except the socket 40(n), hereinafter referred to as the last socket 40(n). Each optical coupler 42(1)-42(n) corresponds to one of the plurality of optical channels L1-Ln. Each optical coupler 42(1)-42(n) may split and direct an optical signal from the optical connector 13 into two consecutive sockets (e.g., socket 40(1) and 40(2)). Each optical coupler 42(1)-42(n) may also couple together optical signals output from two consecutive sockets (e.g., socket 40(1) and 40(2)). The optical channels L1-Ln may be polymer waveguides, optical fibers or the like. The optical channels L1-Ln may be disposed on or within the system board 8. Although the optical couplers 42(1)-42(n) are not arranged in front of the last socket 40(n), the optical channels L1-Ln are also connected to the socket 40(n).

Figure 4:
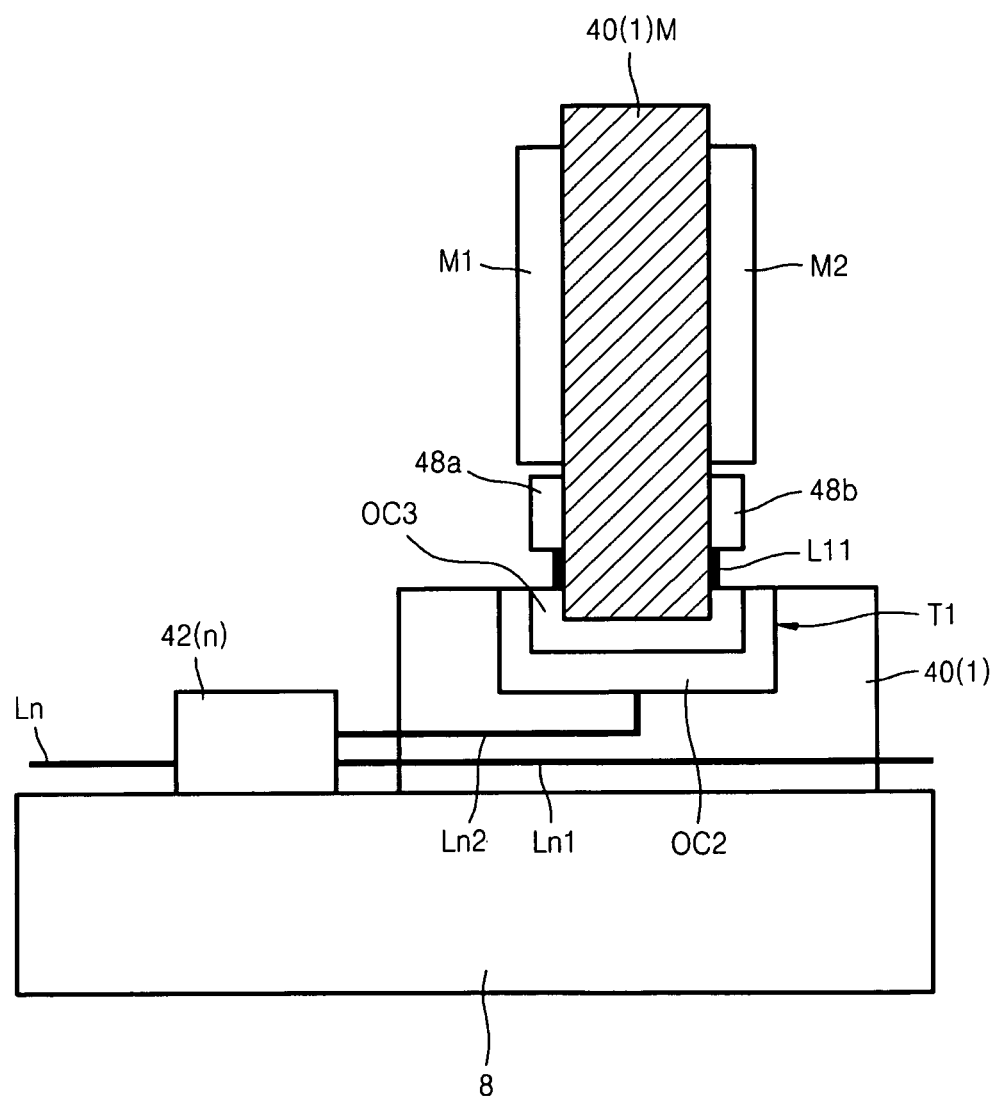
FIG. 4 is a cross-sectional view of a portion of the semiconductor apparatus of FIG. 3 taken along a line 4-4'.

FIG. 4 is a cross-sectional view of a portion of the semiconductor apparatus of FIG. 3 taken along a line 4-4'.

Referring to FIG. 4, the first socket 40(1) is mounted on the system board 8. The optical coupler 42(n) is mounted in front of the first socket 40(1). A second optical connector OC2 is disposed in a trench T1 of the first socket 40(1). Alternatively, however, the second optical connector OC2 may be formed on the top surface of the first socket 40(1). In this case, the first socket 40(1) may not include the trench T1. A third optical connector OC3 is disposed at a bottom end of the memory module 40(1)M, which faces the second optical connector OC2. The third optical connector OC3 may be connected to the second optical connector OC2 and to the memory module 40(1)M when the memory module 40(1)M is inserted into the first socket 40(1). In FIG. 4, the third optical connector OC3 surrounds the bottom end of the memory module 40(1)M. However, the third optical connector OC3 may have other shapes.

Still referring to FIG. 4, first and second memory chips M1 and M2 (e.g., dynamic random access memories (DRAMs)) may be mounted on respective (first and second) sides of the memory module 40(1)M. A second optical-electrical module 48a is mounted on the memory module 40(1)M between the first memory chip M1 and the third optical connector OC3. A third optical-electrical module 48b is mounted on the memory module 40(1)M between the second memory chip M2 and the third optical connector OC3. The third optical connector OC3 is connected to the second and third optical-electrical modules 48a and 48b via optical channels L11.

As shown in FIG. 4, the optical coupler 42(n) branches the optical channel Ln from the first optical connector 13 into two optical channels Ln1 and Ln2. The optical channel Ln2 of the branched two optical channels Ln1 and Ln2 is connected to the second optical connector OC2, whereas the optical channel Ln1 is connected to a subsequent (or following) socket (e.g., socket 40(2)).

Figure 5:
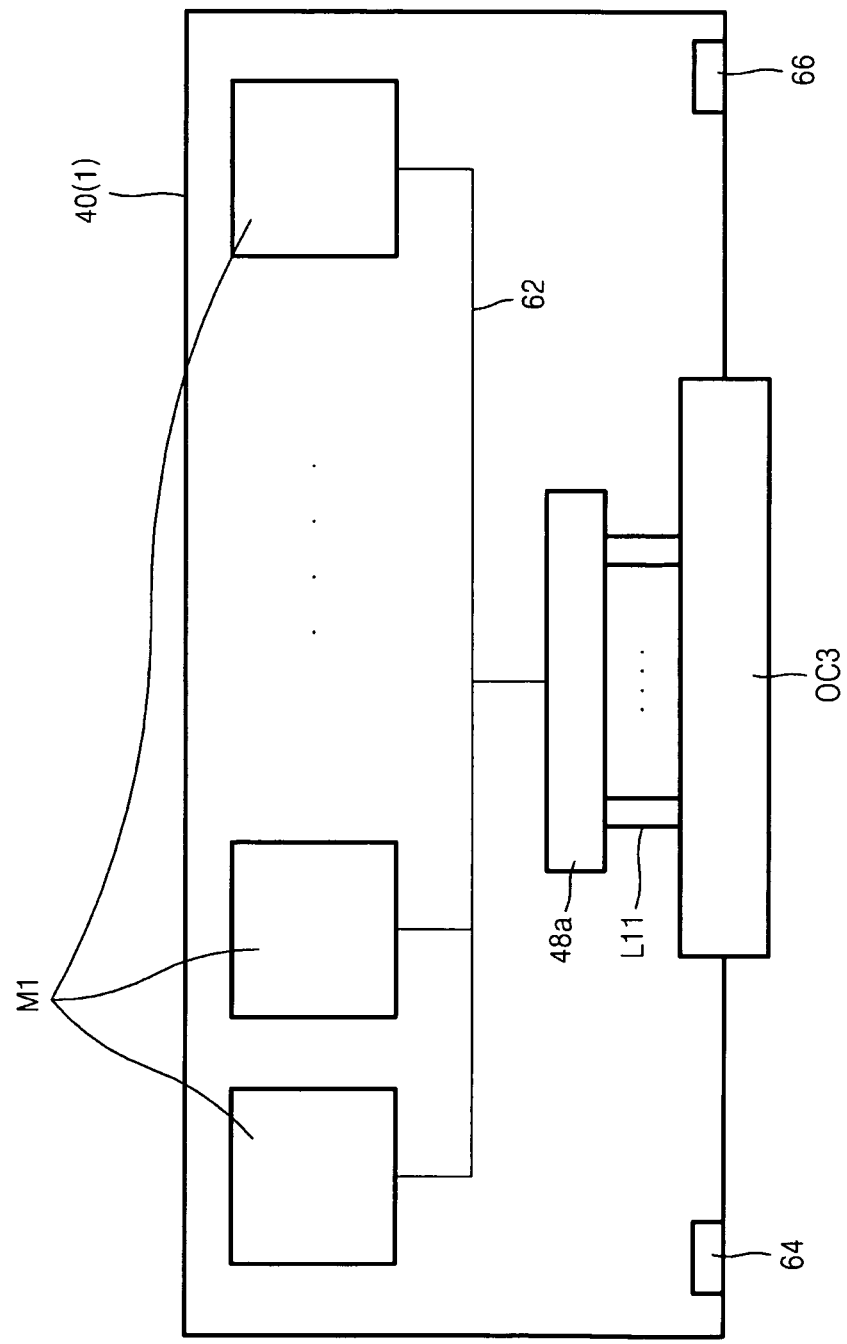
FIG. 5 is a front view of a memory module of FIG. 4 on which an optical-electrical module may be mounted.

FIG. 5 is a front view of the memory module 40(1)M of FIG. 4 on which the optical-electrical module 48a may be mounted.

Referring to FIG. 5, in this example embodiment the third optical connector OC3 is mounted on the bottom end of the memory module 40(1)M, which may be inserted into the socket 40(1). The second optical-electrical module 48a is mounted on the memory module 40(1)M above the third optical connector OC3. The third optical connector OC3 is connected to the second optical-electrical module 48a via optical channels L11. A plurality of first memory chips M1 are mounted on the memory module 40(1)M above the second optical-electrical module 48a. The second optical-electrical module 48a is connected to each of the plurality of first memory chips M1 via electrical wires 62. First and second contact units 64 and 66 are disposed at lower ends of the memory module 40(1)M. The first and second contact units 64 and 66 are formed to be connected to a source voltage or to be grounded, respectively. A source voltage may be supplied to the second optical-electrical module 48a and the plurality of first memory chips M1 via the first contact unit 64. The same or substantially the same configuration may be formed on the surface of the memory module 40(1)M on which the one or more second memory chips M2 are mounted.

Figure 6:
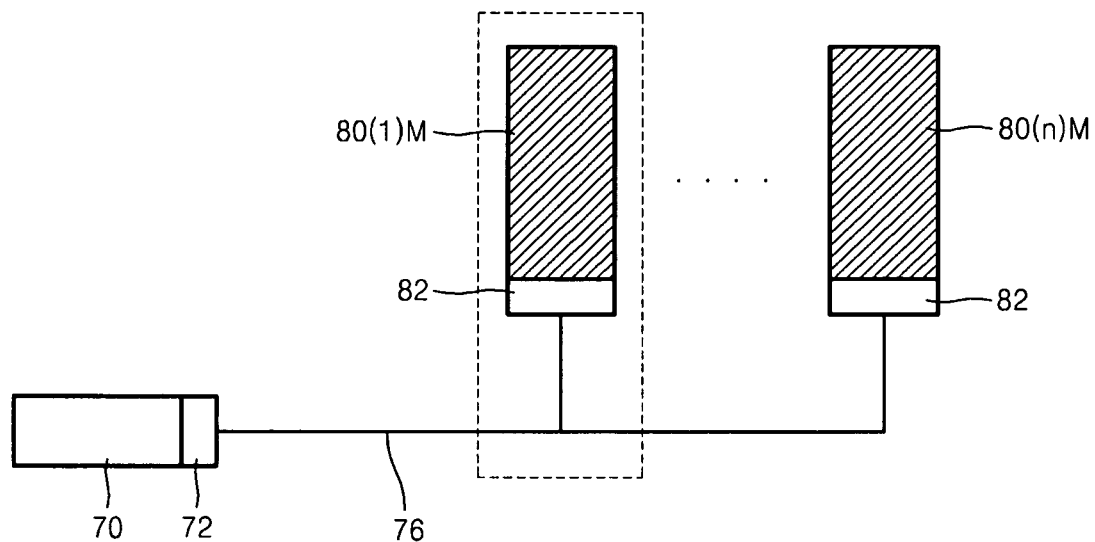
FIG. 6 is a diagram schematically showing a semiconductor apparatus having optical connections according to another example embodiment.

FIG. 6 is a diagram schematically showing a semiconductor apparatus having optical connections according to another example embodiment.

Referring to FIG. 6, according to this example embodiment a memory controller 70 and a first optical-electrical module 72 are integrated with one another to constitute a CPU package. The first optical-electrical module 72 is connected to a plurality of memory modules 80(1)M-80(n)M via an optical channel 76. As was the case above, n is a natural number greater than 1. Each of the plurality of memory modules 80(1)M-80(n)M is connected to the optical channel 76 via a corresponding second optical-electrical module 82.

Figure 7:
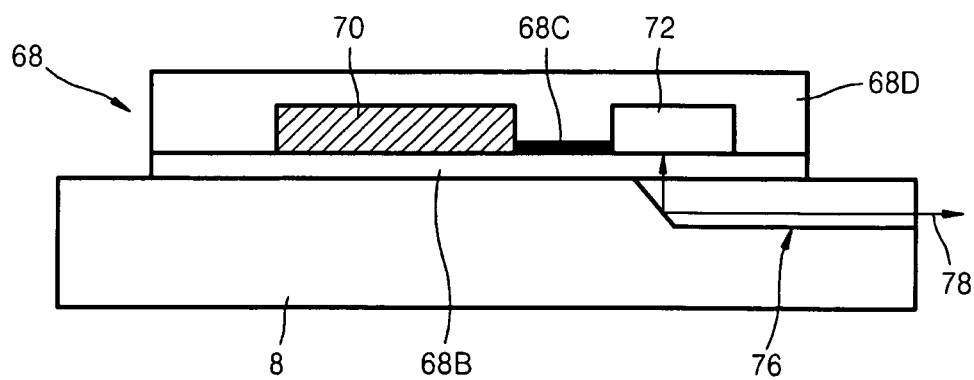
FIGS. 7 to 9 are cross-sectional views illustrating various connection relationships between a memory controller and an optical-electrical module.
Figure 8:
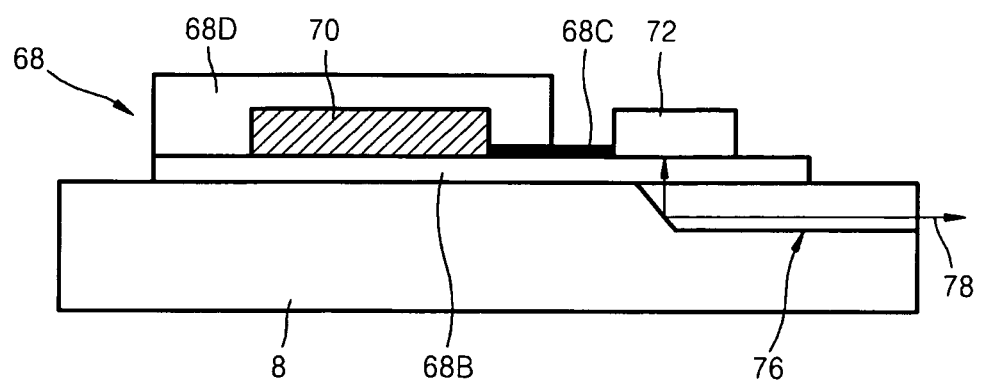
Figure 9:
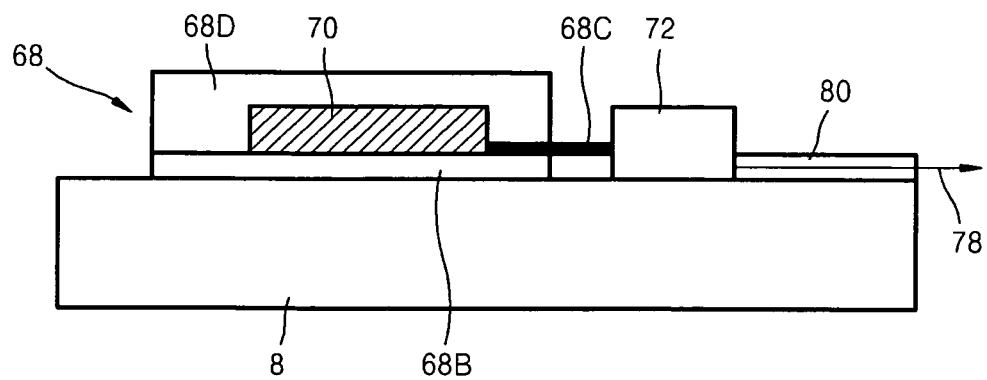

FIGS. 7-9 are cross-sectional views of CPU packages including the memory controller 70 and the first optical-electrical module 72 of FIG. 6 according to example embodiments.

Referring to FIG. 7, according to this example embodiment a CPU package 68 is formed on the system board 8. The CPU package 68 includes the memory controller 70 and the first optical-electrical module 72 arranged on a CPU board 68B. The memory controller 70 includes a CPU and is connected to the first optical-electrical module 72 via electrical wires 68C. The memory controller 70, the first optical-electrical module 72, and the electrical wires 68C are covered with a protection layer 68D. An optical channel 76 is formed on (or in) the system board 8. The optical channel 76 may be formed on the system board 8 as a groove, a polymer optical waveguide, an optical fiber, or the like. An optical signal output from the first optical-electrical module 72 is transmitted to the sockets 80(1)-80(n) (shown in FIG. 6) via the CPU board 68B and the optical channel 76. In addition, an optical signal 78 carrying information output from the memory modules 80(1)M-80(n)M may pass through the CPU board 68B to be incident onto the first optical-electrical module 72. The first optical-electrical module 72 converts the optical signal 78 into an electrical signal and transmits the electrical signal to the memory controller 70.

Referring to FIG. 8, the memory controller 70 and the first optical-electrical module 72 are formed on the same CPU board 68B. But, the first optical-electrical module 72 is formed separately from the CPU package 68. For example, the memory controller 70 is covered by the protection layer 68D, whereas the first optical-electrical module 72 is not. The memory controller 70 is connected to the first optical-electrical module 72 via the electrical wires 68C. The memory controller 70 and the first optical-electrical module 72 may operate in the same or substantially the same manner as described above with regard to FIG. 7.

FIG. 9 illustrates an example embodiment in which the first optical-electrical module 72 is formed outside of the CPU package 68 and mounted on a board other than the CPU board 68B.

Referring to FIG. 9, in this example embodiment the CPU package 68 including the memory controller 70 is mounted on the system board 8. More specifically, the memory controller 70 is formed on the CPU board 68B, which is further formed on the system board 8. The memory controller 70 is covered by the protection layer 68D. The first optical-electrical module 72 is mounted on (e.g., directly on) the system board 8.

The CPU package 68 and the first optical-electrical module 72 are spaced apart from one another and connected to each other via electrical wires 68C. The first optical-electrical module 72 is connected to an optical channel 80, which is also formed on (e.g., directly on) the system board 8. In example operation, the first optical electrical module 72 converts an electrical signal from the memory controller 70 into an optical signal 78, and transmits the optical signal 78 to the memory modules 80(1)M-80(n)M in FIG. 6 via the optical channel 80. In addition, the first optical-electrical module 72 converts an optical signal received via the optical channel 78 into an electrical signal and transmits the electrical signal to the memory controller 70 via the electrical wires 68C.

The configuration of the memory controller 70 and the first optical-electrical module 72 shown in FIGS. 7-9 may also be applied to other example embodiments.

Figure 10:
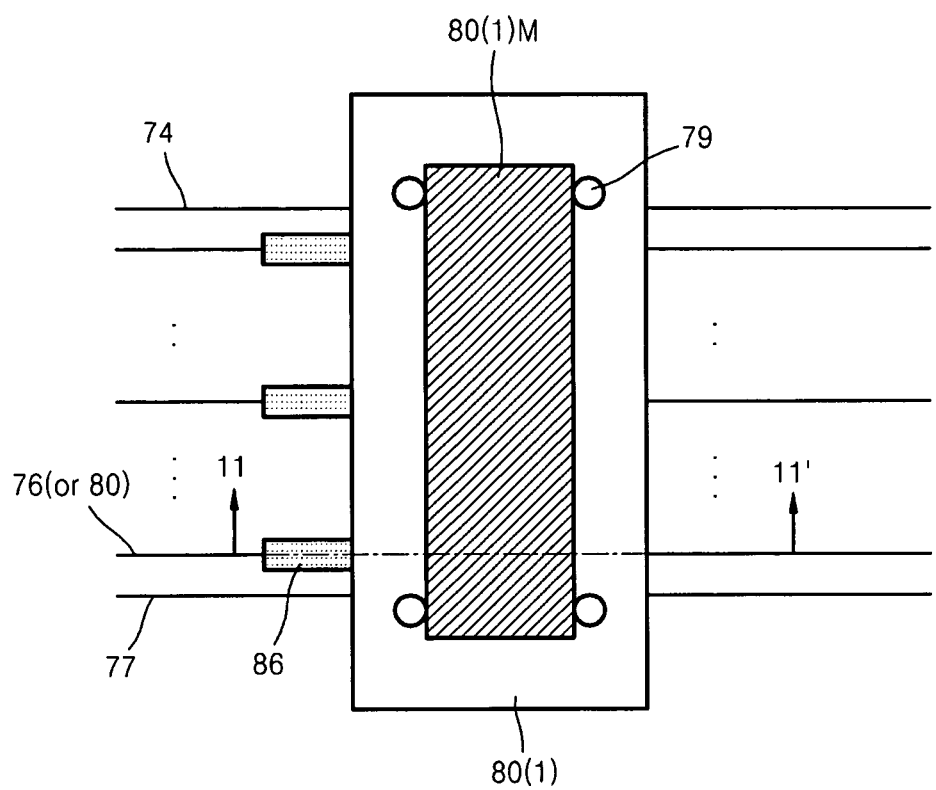
FIG. 10 is a plan view of an example memory module of the semiconductor apparatus of FIG. 6.

FIG. 10 is a plan view of an example embodiment of the memory module 80(1)M of FIG. 6.

Referring to FIG. 10, in this example embodiment a plurality of transmission lines 74, 76, and 77 are disposed under an optical coupler 86 and a socket 80(1). The plurality of transmission line 74, 76, and 77 include electrical wires 74 and 77 and optical channels 76 (or 80). A memory module 80(1)M may be mounted in the socket 80(1). A guide unit 79 mechanically, electrically, and optically aligns the memory module 80(1)M when inserted.

Figure 11:
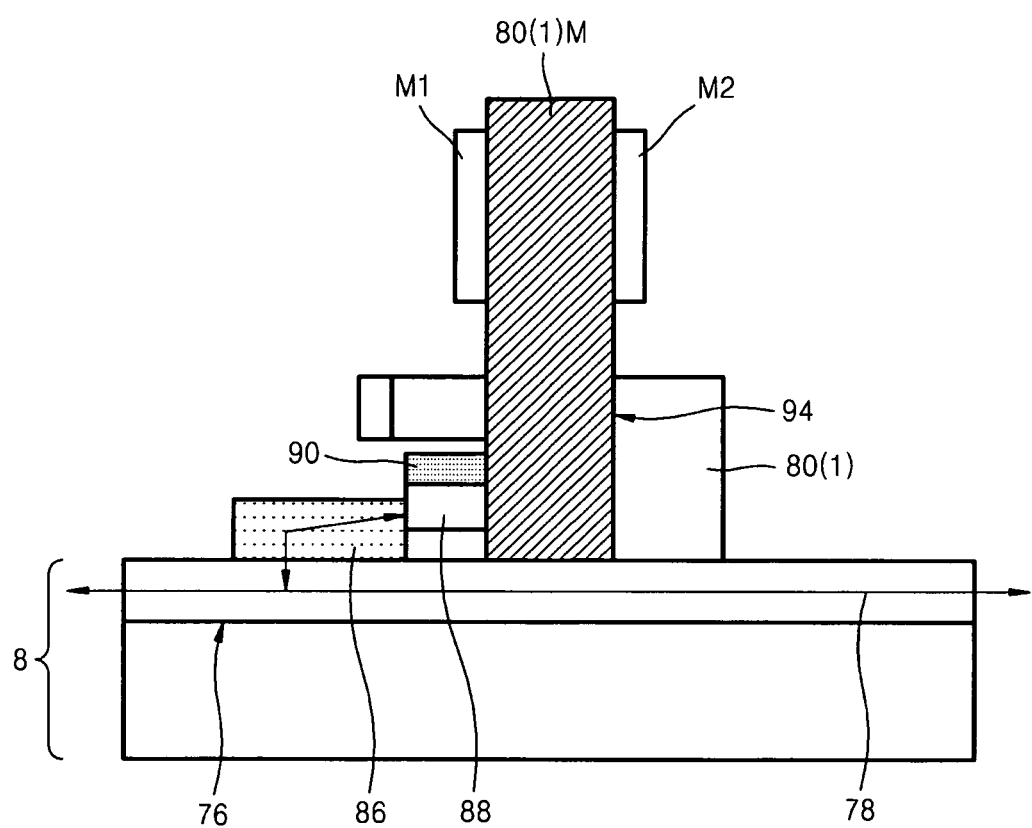
FIG. 11 is a cross-sectional view of the memory module of FIG. 10 taken along line 11-11'.

FIG. 11 is a cross-sectional view of the memory module 80(1)M of FIG. 10 taken along a line 11-11'.

Referring to FIG. 11, in this example embodiment an optical channel 76 is disposed in the system board 8. And, the optical coupler 86, the memory module 80(1)M, and the socket 80(1) are disposed on the optical channel 76. The memory module 80(1)M is connected to the system board 8 via a through hole 94 formed in the socket 80(1). A second optical-electrical module 88 is mounted on a first surface of the bottom end of the memory module 80(1)M. A buffer chip 90 may be integrated with the second optical-electrical module 88. Alternatively, in a package form, the buffer chip 90 may be formed on the first surface of the bottom end of the memory module 80(1)M. The first surface of the memory module 80(1)M may face the optical coupler 86. The optical coupler 86 is optically connected to the second optical-electrical module 88.

Figure 12:
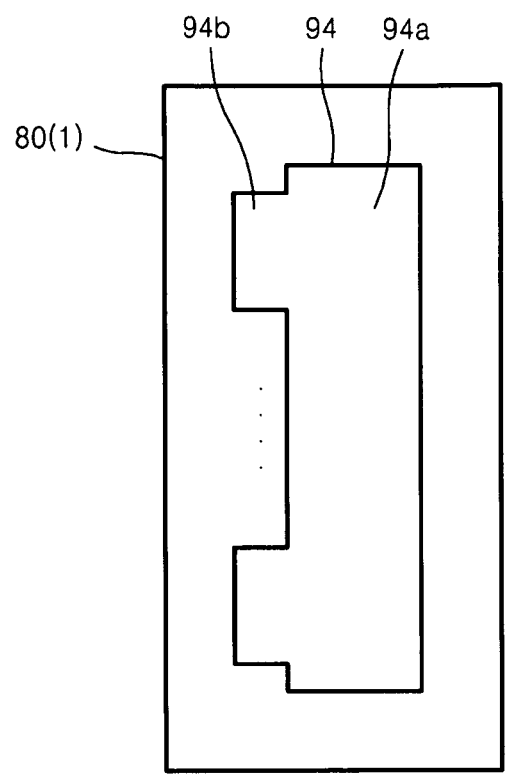
FIG. 12 is a plan view of an example socket mounted on a memory module of FIG. 11.

FIG. 12 is a plan view of an example embodiment of the socket 80(1) of FIG. 11.

Referring to FIG. 12, in this example embodiment the through hole 94 of the socket 80(1) includes a first through hole portion 94a and a second through hole portion 94b. When inserted, the body of the memory module 80(1)M passes through the first through hole portion 94a, and the second optical-electrical module 88 and the buffer chip 90 mounted on the memory module 80(1)M pass through the second through hole portion 94b. The second through hole portion 94b may be smaller than the first through hole portion 94a. In one example, the second through hole portion 94b may be an outward extending portion of the first through hole portion 94a.

Figure 13:
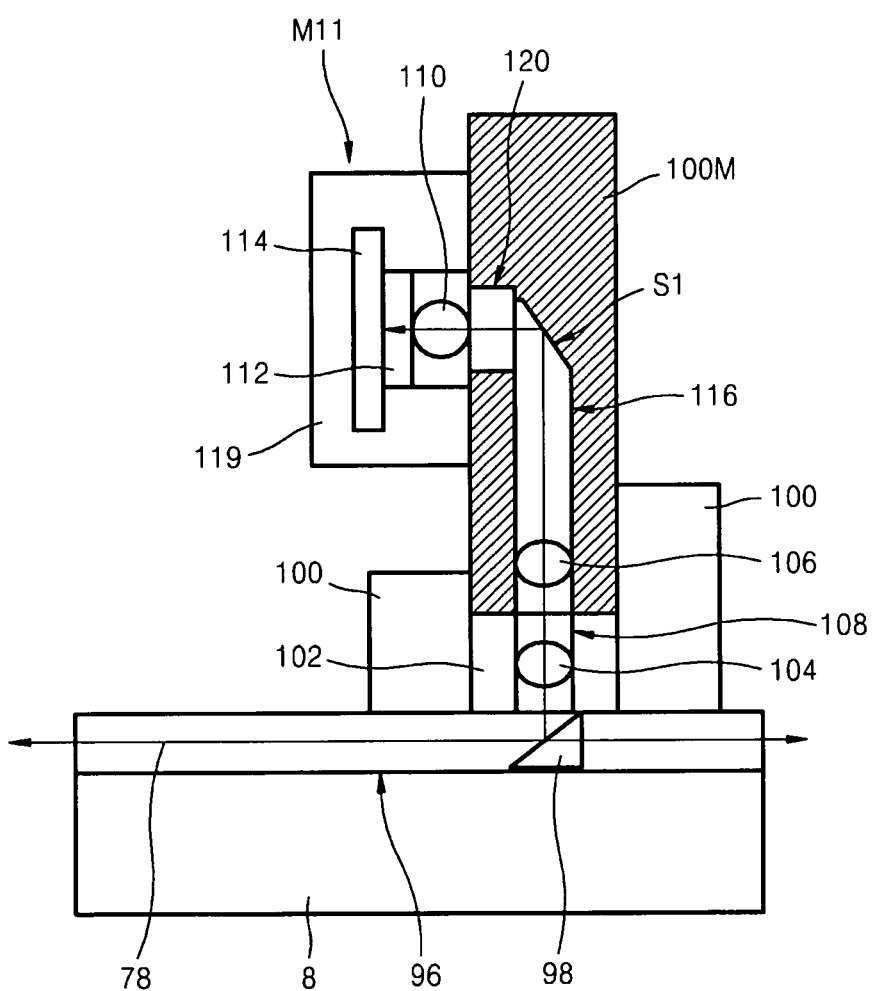
FIG. 13 shows a semiconductor memory apparatus having optical connections according to another example embodiment.

FIG. 13 is a cross-sectional view of a portion of a semiconductor memory apparatus having optical connections according to another example embodiment.

According to this example embodiment, a memory controller and/or a CPU package of FIG. 13 may be the same or substantially the same as those of FIG. 1, 3, or 7 to 9. Thus, these components are omitted from FIG. 13.

Referring to FIG. 13, in this example embodiment an optical channel 96 is disposed on the system board 8. An optical reflector 98 is disposed in the path of the incident light 78 in the optical channel 96. The optical reflector 98 partially transmits the incident light 78 and reflects the residual light toward a memory module 100M. The optical reflector 98 may be a prism, an optical power splitter, or the like. A socket 100, an optical alignment medium 102, and the memory module 100M are disposed on the optical channel 96. The optical alignment medium 102 is disposed inside the socket 100. The optical alignment medium 102 may be a first optical system. For example, the optical alignment medium 102 may include a first vertical light transmitting path 108 (e.g., a waveguide). The vertical light transmitting path 108 includes a first micro ball lens 104. The first micro ball lens 104 may be a collimating lens configured to align light reflected by the optical reflector 98 to be collimated. Accordingly, the optical alignment medium 102 may be disposed such that an optical axis of the first micro ball lens 104 meets an optical axis of the reflective surface of the optical reflector 98.

The memory module 100M is mounted on the optical alignment medium 102 disposed inside the socket 100. The socket 100 and the memory module 100M may include a guide unit (not shown) for optical alignment. The memory module 100M includes a second vertical light transmitting path 116 (e.g., a waveguide). The second vertical light transmitting path 116 may be formed (e.g., continuously) from the first vertical light transmitting path 108. The second vertical light transmitting path 116 includes a second micro ball lens 106, an upper reflective surface S1 and a window 120. The second micro ball lens 106 concentrates light incident from the first micro ball lens 104 and focuses the light on the upper reflective surface S1.

Light reflected by the upper reflective surface S1 passes through the window 120 and is incident on an optical-electrical module 112 embedded in the memory chip M11. The second vertical light transmitting path 116, the second micro ball lens 106, the upper reflective surface S1, and the window 120 may constitute a second optical system. The memory module 100M may be optically aligned such that the second micro ball lens 106 is positioned on the same optical axis as that of the first micro ball lens 104.

Still referring to FIG. 13, the memory chip M11 is mounted on a first surface of the memory module 100M. The memory chip M11 may include a memory die 114, the optical-electrical module 112, and a third micro ball lens 110. The third micro ball lens 110 may be a third optical system. The memory die 114, the optical-electrical module 112, and the third micro ball lens 110 may be covered with a protection layer 119. The memory die 114 may include a plurality of memory devices (not shown). The optical-electrical module 112 with the plurality of memory devices may be disposed on the memory die 114.

The optical-electrical module 112 may include a semiconductor laser using, for example, Group III-V compound semiconductors, and a light receiving device. Alternatively, the optical-electrical module 112 may include a silicon photonics modulator, a photodiode, and an external light source. The external light source may be a semiconductor laser using, for example, Group III-V compound semiconductors. The third micro ball lens 110 transmits light reflected by the upper reflective surface S1 of the second vertical light transmitting path 116 to the optical-electrical module 112. On the other hand, the third micro ball lens 110 concentrates light from the optical-electrical module 112 on the upper reflective surface S1 of the second vertical light transmitting path 116. The optical-electrical module 112 may be configured to convert electrical signals generated at the memory chip M11 into optical signals to be output via the first, second and third optical systems. The optical-electrical module 112 may also be configured to convert optical signals received via the third optical system into electrical signals to be output to the memory chip M11.

The memory chip M11 may be formed after aligning optical axes of the second and third micro ball lenses 106 and 110 to meet on the upper reflective surface S1. The third micro ball lens 110 and the memory chip M11 may form a package.

Figure 14:
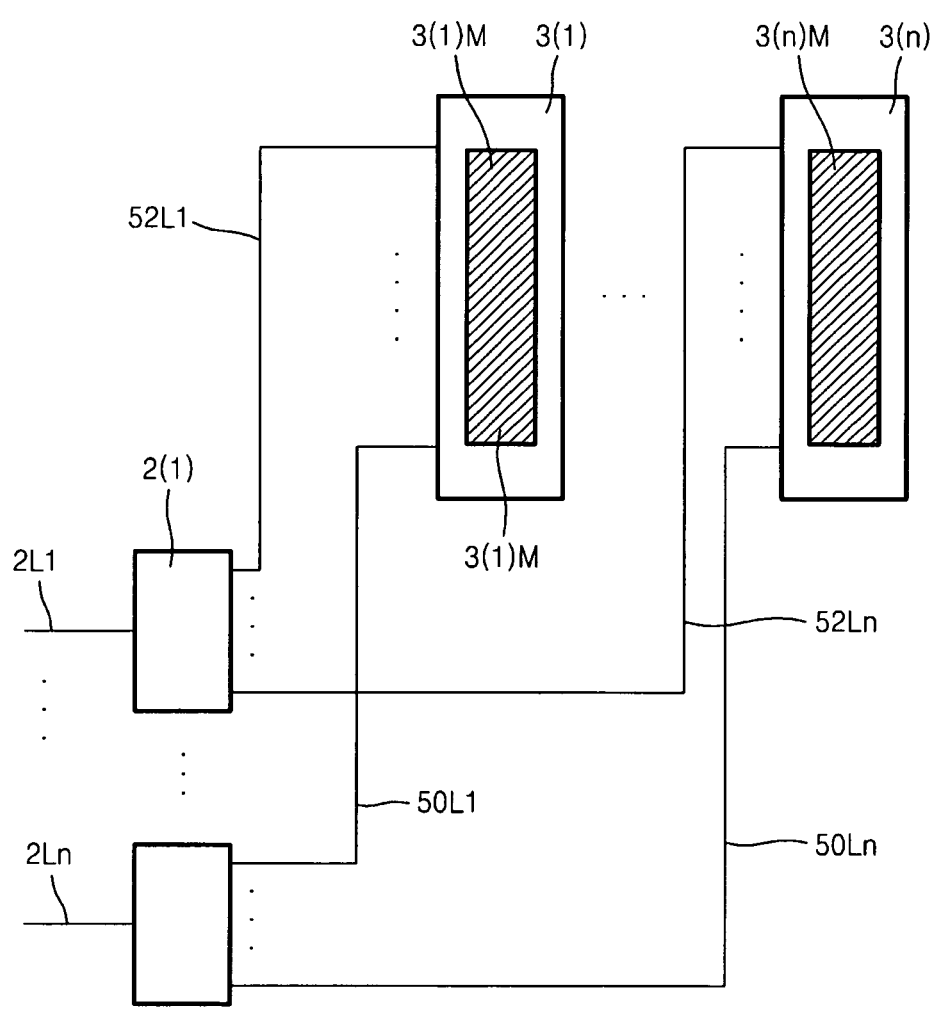
FIGS. 14 and 15 are plan views of a semiconductor apparatus showing example distributions of optical signals to a plurality of memory modules.
Figure 15:
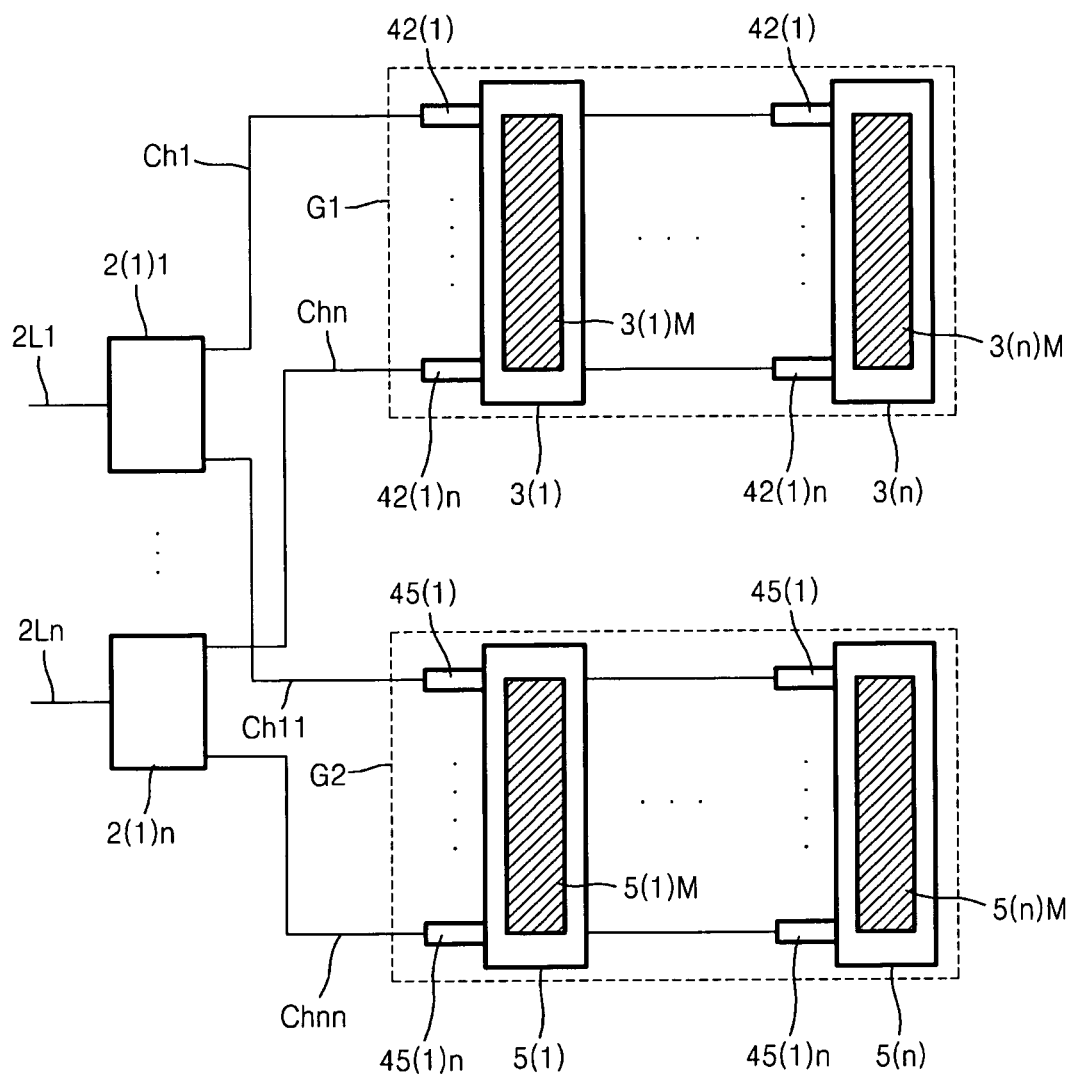

FIGS. 14 and 15 are plan views of example embodiments of semiconductor apparatuses showing example distributions of optical signals to a plurality of memory modules.

Referring to FIG. 14, optical power distributors 2(1) to 2(n), wherein n is a natural number, distribute light from a first optical-electrical module 12 (not shown in FIG. 14) connected to a memory controller 10 (not shown in FIG. 14) to each of memory modules 3(1)M to 3(n)M. The optical power distributor 2(1), hereinafter referred to as the first optical power distributor 2(1), is connected to the first optical-electrical module 12 via a first optical channel 2L1. The optical power distributor 2(n), hereinafter referred to as the n$^{th}$ optical power distributor 2(n) is connected to the first optical-electrical module 12 via an n$^{th}$ optical channel 2Ln. Thus, the number of optical power distributors may be equal to the number of optical channels connected to the first optical-electrical module 12.

The first optical power distributor 2(1) splits an optical signal from the first optical channel 2L1 into a number of optical signals equal to the number of memory modules 3(1)M-3(n)M (e.g., into n parts), and transmits the split optical signals to each of the memory modules 3(1)M-3(n)M. The split optical signals transmitted from the first optical power distributor 2(1) are transmitted to each of the memory modules 3(1)M-3(n)M via first channels 52L1-52Ln corresponding to the memory modules 3(1)M-3(n)M. Also, the last optical power distributor, the $n^{th}$ optical power distributor 2(n) splits an optical signal from the $n^{th}$ optical channel 2Ln into a number of optical signals equal to the number of memory modules 3(1)M-3(n)M (e.g., into n parts), and transmits the split optical signals to each of the memory modules 3(1)M-3(n)M via channels 50L1-50Ln corresponding to the memory modules 3(1)M-3(n)M. Each of the memory modules 3(1)M-3(n)M may be mounted in a corresponding one of sockets 3(1)-3(n).

FIG. 15 is an example combination of FIGS. 13 and 14.

Referring to FIG. 15, each of the optical power distributors 2(1)1-2(1)n splits optical signals from the optical channels 2L1-2Ln of the first optical-electrical module 12 into two signals, and transmits one signal to a first memory module group G1 and the other signal to a second memory module group G2. Thus, a split signal by the first optical power distributor 2(1)1 is transmitted to a first channel Ch1 of the first memory module group G1. Via the first channel Ch1, optical signals are transmitted to the first to $n^{th}$ memory modules 3(1)M-3(n)M in the first memory module group G1. The optical signal is split into each of the memory modules 3(1)M-3(n)M by the optical coupler 42(1) formed in front of each of the memory modules 3(1)M-3(n)M. The other split optical signal split by the first optical power distributor 2(1)1 is transmitted to the first to $n^{th}$ memory modules 5(1)M-5(n)M in the second memory module group G2 via the first channel Ch11. The optical signal is split into each of the first to $n^{th}$ memory modules 5(1)M-5(n)M by the optical coupler 45(1) formed in front of each of the first to $n^{th}$ memory modules 5(1)M-5(n)M.

In the same manner as in the first optical power distributor 2(1)1, an optical signal split into two signals by the $n^{th}$ optical power distributor 2(1)n is transmitted to last channels Chn and Chnn of memory modules 3(1)M-3(n)M of the first memory module group G1 and memory modules 5(1)M-5(n)M of the second memory module group G2, and split into each memory module by optical couplers 42(1)n and 45(1)n formed in front of each memory modules 3(1)M-3(n)M. In this example method, a relatively large number of memory modules may be connected to a single CPU without decreasing transmission speed, thereby increasing memory capacity.

The optical power distributors described above may be applied to semiconductor apparatuses having optical connections.

Figure 16:
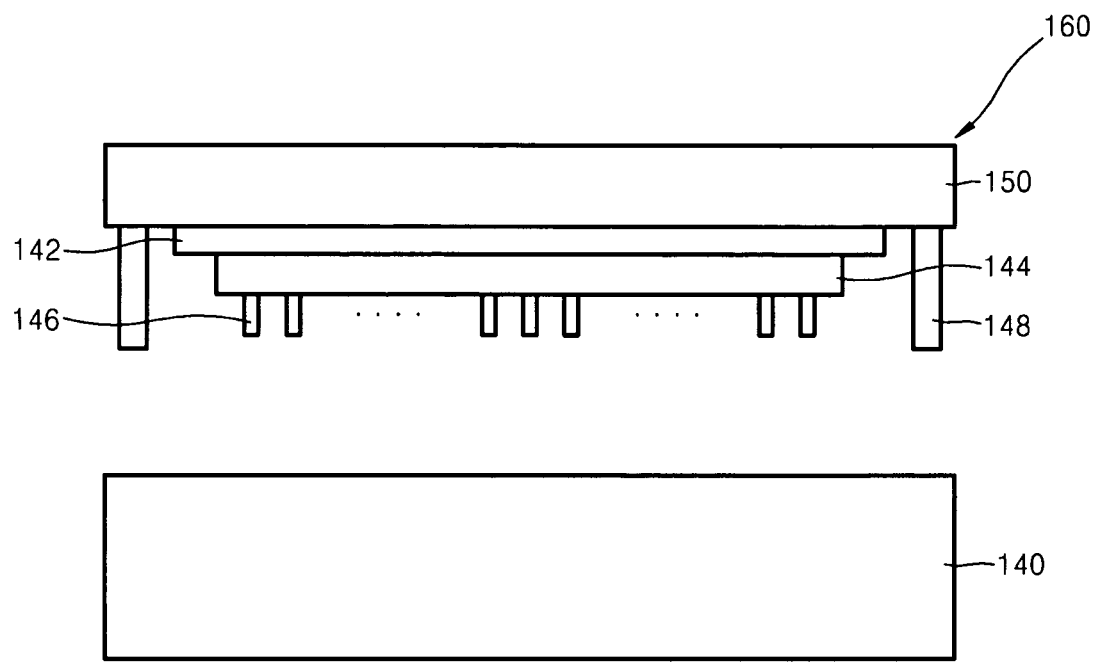
FIG. 16 shows an optical connector according to an example embodiment.

FIG. 16 shows an optical connector according to an example embodiment.

Referring to FIG. 16, in this example embodiment an optical connector includes a lower connector 140 and an upper connector 160. The lower connector 140 may be disposed in a socket side, and the upper connector 160 may be disposed in the memory module side, or vice versa. The upper connector 160 includes a supporting unit 144 fixing an optical channel 146 on a bottom surface of a substrate 150 facing the lower connector 140. A rubber seal 142 is disposed around the supporting unit 144 to suppress and/or prevent the penetration of moisture and/or dust after the upper and lower connectors 160 and 140 are coupled. In addition, guide pins 148 are disposed on edges of the bottom surface of the substrate 150 to optically align the upper and lower connectors 160 and 140. The lower connector 140 may include grooves (not shown) for the guide pin 148.

While the general inventive concept has been particularly shown and described with reference to example embodiments thereof, it will be understood that various changes in form and details may be made therein without departing from the spirit and scope of the following claims.

What is claimed is:

1. A semiconductor apparatus comprising:
   a memory controller;
   at least one socket configured to be connected to a memory module, the socket having an H shape, the H shape defining a top area and a bottom area;
   a first optical-electrical module connected to the memory controller;
   a second optical-electrical module mounted in the bottom area of the socket, the second optical-electrical module being optically coupled to the first optical-electrical module via a plurality of optical channels; and
   a plurality of optical power distributors arranged between the memory controller and the at least one socket, wherein a number of the optical power distributors are equal to a number of the optical channels, and signals distributed by one of the plurality of optical power distributors are individually transmitted to each one of the at least one socket.

2. The semiconductor apparatus of claim 1, further comprising:
   a memory module mounted in the top area of the socket, the memory module being connected to the second optical-electrical module.

3. The semiconductor apparatus of claim 2, wherein the second optical-electrical module is configured to,
   convert electrical signals from the memory module connected to the second optical-electrical module into optical signals and output the optical signals to the first optical-electrical module via the optical channels, and
   convert optical signals from the optical channels into electrical signals to be input to the memory module.

4. The semiconductor apparatus of claim 1, wherein the memory controller and the first optical-electrical module are mounted on the same or different boards to form a central processing unit (CPU) package.

5. The semiconductor apparatus of claim 4, further comprising:
   an optical connector arranged between the CPU package and the socket, the optical connector being optically connected to the first optical-electrical module.

6. The semiconductor apparatus of claim 1, wherein the second optical-electrical module is disposed on a bottom surface of the socket to face the optical channels.

7. The semiconductor apparatus of claim 1, wherein the optical channels is an optical fiber or an optical waveguide and is disposed on or in a system board.

8. The semiconductor apparatus of claim 1, further comprising:
   electrical wires connecting the memory controller and the first optical-electrical module.

9. The semiconductor apparatus of claim 1, wherein the at least one socket includes a plurality of sockets, and wherein
   each of the plurality of sockets has a second optical-electrical module mounted therein, and
   each of the second optical-electrical modules is optically coupled to the first optical-electrical module via at least one of the optical channels.

10. A semiconductor apparatus comprising:
    a memory controller;
    a socket configured to receive a memory module;
    a first optical connector disposed in the socket;
    an optical coupler optically coupled to the memory controller and the first optical connector via corresponding optical channels, the optical coupler being configured to split and couple optical signals between the memory controller and the first optical connector; and an optical power distributor connected between the memory controller and the socket, wherein the optical power distributor is configured to split an optical signal from the memory controller into a number of optical signals equal to a number of memory module groups, each of the memory module groups including a plurality of memory modules, and the optical power distributor is configured to transmit respective one of the split optical signals to each one of the memory modules in a corresponding one of the memory module groups.

11. The semiconductor apparatus of claim 10, further comprising:
a second optical connector connected between the memory controller and the optical coupler.

12. The semiconductor apparatus of claim 10, further comprising:
a memory module mounted in the socket; and
a third optical connector disposed on the memory module, and connected to the first optical connector, the third optical connector being in optical communication with the first optical connector, wherein the first optical connector surrounds the bottom end of the memory module and optically coupled to the third optical connector.

13. The semiconductor apparatus of claim 12, wherein the memory module includes a plurality of memory chips, the apparatus further comprising:
an optical-electrical module mounted on the memory module, the optical-electrical module being configured to,
convert electrical signals from the plurality of memory chips into optical signals to be output to the third optical connector, and
convert optical signals from the third optical connector into electrical signals to be input to the plurality of memory chips.

14. The semiconductor apparatus of claim 12, wherein the memory module and the socket comprise a memory module fixing unit configured to fix the memory module to the socket.

15. The semiconductor apparatus of claim 10, wherein the memory controller includes an optical-electrical module and a central processing unit (CPU) coupled together via electrical wires, the optical-electrical module being optically coupled to the optical coupler.

16. The semiconductor apparatus of claim 10, wherein the optical coupler is physically connected to the first optical connector with the optical channels.

17. The semiconductor apparatus of claim 11, wherein the second optical connector is physically connected to the optical coupler with the optical channels.

18. A semiconductor apparatus comprising:
a memory controller;
a first optical-electrical module connected to the memory controller;
a socket;
a memory module removably mounted in the socket; and
a second optical-electrical module mounted on the memory module, the second optical-electrical module being electrically coupled to the memory module, and optically coupled to the first optical-electrical module via a plurality of optical channels; and
a plurality of optical power distributors arranged between the memory controller and the socket, wherein a number of the optical power distributors are equal to a number of the optical channels, and signals distributed by one of the plurality of optical power distributors are individually transmitted to each one of the at least one socket.

19. The semiconductor apparatus of claim 18, wherein the second optical-electrical module is configured to,
convert input optical signals from the first optical-electrical module into output electrical signals to be transmitted to the memory module, the input optical signals and the output electrical signals carrying information generated by the memory controller, and
convert input electrical signals from the memory module into output optical signals to be transmitted to the first optical-electrical module, the input electrical signals and the output optical signals including information from the memory module.

20. The semiconductor apparatus of claim 18, wherein the second optical-electrical module is arranged outside the socket.

* * * * *